United States Patent
Jones et al.

(10) Patent No.: US 6,569,057 B2
(45) Date of Patent: May 27, 2003

(54) MOTOR VEHICLE TRANSMISSION SYSTEM

(75) Inventors: Charles John Jones, Coventry (GB);
Robin John Warren, Leamington Spa (GB); Ian Duncan Kennedy, Leamington Spa (GB)

(73) Assignee: LuK Lamellen und Kupplungsbau Beteiliungs KG, Buhl (DE)

( * ) Notice: Subject to any disclaimer, the term of this patent is extended or adjusted under 35 U.S.C. 154(b) by 0 days.

(21) Appl. No.: 09/977,919

(22) Filed: Oct. 15, 2001

(65) Prior Publication Data

US 2002/0056585 A1 May 16, 2002

Related U.S. Application Data

(63) Continuation of application No. PCT/DE00/01192, filed on Apr. 12, 2000.

(30) Foreign Application Priority Data

Apr. 14, 1999 (GB) .......................................... 99 084 78

(51) Int. Cl.[7] .............................................. B60K 41/28

(52) U.S. Cl. .............................. 477/74; 477/75; 477/77; 477/99

(58) Field of Search .............................. 477/71, 74, 75, 477/77, 79, 97, 99

(56) References Cited

U.S. PATENT DOCUMENTS 5,454,768 A * 10/1995 Jones et al. .................... 477/74
5,957,805 A *  9/1999 Salecker et al. ............... 477/74
5,964,680 A * 10/1999 Salecker et al. ............... 477/74

* cited by examiner

Primary Examiner—Sherry Estremsky
(74) Attorney, Agent, or Firm—Darby & Darby

(57) ABSTRACT

A motor vehicle transmission system blocks the disengagement of the clutch (14) and the shifting of the transmission (12) into neutral for starting the engine (10), if the transmission is already in gear at the time the system is switched on. The blocking is canceled if the main brake (58) is applied and the application of the brake (58) is confirmed by a brake sensor (56), or if the driver moves a shifter element (24) from a non-neutral shift-gate position to the neutral shift-gate position after the system has been turned on.

20 Claims, 3 Drawing Sheets

MOTOR VEHICLE TRANSMISSION SYSTEM

This is a continuation of international application Serial No. PCT/DE00/01192, filed Apr. 12, 2000, the entire disclosure of which is hereby incorporated by reference.

BACKGROUND OF THE INVENTION

The present invention relates to automatic or semi-automatic systems or devices for transmitting torque through the power trains of a motor vehicles that are equipped with an engine, a transmission with a plurality of transfer ratios, and a clutch which in the preferred case establishes a torque-transmitting connection between the engine and the transmission, but could also be arranged downstream of the transmission.

The transmission system preferably includes automatic clutch-actuator means to control the state of engagement of the clutch. It can also be advantageous if the system includes automatic transmission-actuating means to control the operating state of the transmission.

In transmission systems of this kind, the engine is started preferably with the clutch in a disengaged condition. Through a subsequent movement of a shifter element such as a selector lever, a gear is engaged through a control unit and the transmission-actuating means, and the clutch is moved into engagement, e.g., by depressing the accelerator pedal and/or increasing the engine rpm rate.

Existing systems that work in this manner have some undesirable traits, e.g., if the vehicle is parked on an incline and secured only by an engaged gear without using the parking brake. In this situation, the vehicle can roll away when the clutch is disengaged to start the engine, which can take the driver by surprise.

As described in the earlier patent application WO 94/05522, the clutch disengagement and engine start are blocked in systems of this kind, if a gear is found to be engaged when switching on the ignition. The clutch and the engaged gear can be disengaged by moving the shifter element into the neutral position. As an alternative, the system can be equipped with separate means to prevent starting the engine if the transmission is not in a neutral position. In this case, the transmission has to be shifted into neutral before the engine can be started.

The foregoing arrangement is acceptable if the shifter element has to be moved intentionally by the driver, so that the driver anticipates that the clutch will be uncoupled and the gear will be disengaged. However, the system also allows the gear-shifting lever to be moved to the neutral position after the ignition has been turned off. It is desirable in this case if the clutch remains engaged and transmission stays in gear, rather than moving out of engagement when the system is activated again.

OBJECT OF THE INVENTION

It is therefore the object of the present invention to provide a transmission system for a motor vehicle with safeguards, so that the vehicle will not start moving unintentionally and/or unsafely.

SUMMARY OF THE INVENTION

To meet the foregoing objective, the present invention provides a transmission system for a motor vehicle that is equipped with an engine, a transmission with a plurality of transfer ratios, and a clutch which in the preferred case establishes a torque-transmitting connection between the engine and the transmission, but could also be arranged downstream of the transmission. The transmission system has clutch-actuator means to control the state of engagement of the clutch, and transmission-actuating means to shift the transmission into and out of the different gears. Gear-monitoring means are provided to determine if a gear is engaged. There are also means provided to block disengagement of the clutch and shifting of the transmission into neutral for the purpose of starting the engine if upon activating the system, the gear-monitoring means indicate that a gear is engaged. The transmission system of the present invention is equipped with a clutch-disengaging means that allows the clutch to disengage if the transmission is in gear at the time the system is switched on, under the condition that the main brake of the vehicle is applied and the applied state of the main brake is confirmed, or if the shifter element is in a gear position and is moved to the neutral position subsequent to activating the transmission system.

If the vehicle is parked with the transmission in gear, the clutch is taken out of engagement according to the invention, if the main brake of the vehicle is applied so that the vehicle will not start to move unintentionally, or if the driver takes specific action to move the shifter element to the neutral position.

According to a preferred embodiment of the invention, a main-brake sensor, e.g., a brake switch, is used to verify that the main brake is applied. However, the main-brake sensor may not be absolutely reliable. Consequently, additional means are required to ensure that a failure of the main-brake sensor will not lead to one of the following:

- an erroneous indication that the main brake is applied, which would inappropriately cause the clutch to be taken out of engagement, or
- an erroneous indication that the main brake is not applied, which would inappropriately cause the clutch to be blocked.

To prevent the foregoing malfunctions, the invention preferably provides means for monitoring the reliability of the main-brake sensor.

In addition, the invention provides a means whereby the blocking of the clutch disengagement is canceled in situations where the reliability of the main-brake sensor is questionable.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

An embodiment of the invention is described below as an example, making reference to the attached drawings, wherein.

DETAILED DESCRIPTION OF THE INVENTION

Figure 1:
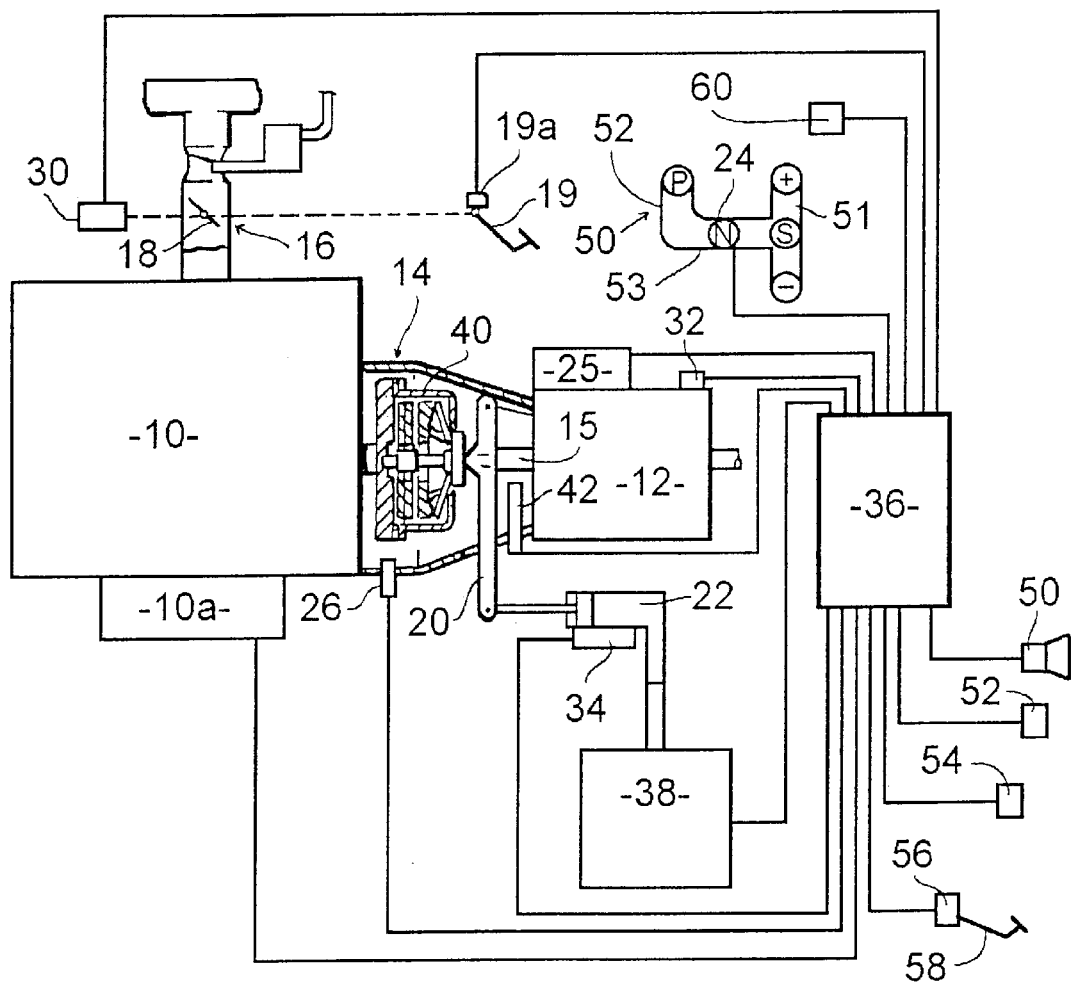
FIG. 1 represents a schematic view of a semi-automatic transmission system according to the invention.

FIG. 1 illustrates an engine 10 with a starter and starter circuit 10a. The engine 10 is connected by way of a friction clutch 14 to a transmission 12 with a transmission input shaft 15 and a plurality of synchronized gears. The fuel supply to the engine is controlled by a throttle valve module 16 with a throttle valve 18 that is actuated through the accelerator pedal 19 or by an electrically powered actuator mechanism. The invention is equally applicable to Otto-cycle engines and diesel engines with electronic or mechanical fuel injection.

The engine can be a combustion engine, such as a diesel engine or an Otto-cycle engine, but the range of engines for which the invention is applicable also includes electric motors or hybrid drives in which a combustion engine and an electric motor are used in combination.

The clutch 14 is operated by way of a release fork 20 that is moved by a clutch-actuating member in the form of a hydraulic slave cylinder 22. The slave cylinder can also be configured as a concentric release cylinder. According to a further embodiment, the clutch may be actuated through a purely mechanical transfer connection without an interposed hydraulic part.

A gear selector lever 24 is moved in a shift gate 50 with two legs 51 and 52 that are connected by a transverse track 53. The transverse connector 53 runs from the lower end of leg 52 to the midpoint of leg 51. The shift gate 50 defines five positions: R (reverse) at the upper end of leg 52, N (neutral) at the midpoint between the ends of the transverse track 53, S (shift) at the point where the transverse track meets leg 51, and the positions marked + and − at the outer ends of leg 51. Within leg 51, the lever 24 is biased to take the position S, which is the lever position for forward travel. A short push of the lever into the position + generates a command signal for the transmission to shift up by one gear level, while a short push of the lever into the position − generates a command to shift down by one gear level.

The positions of the lever 24 are monitored by a number of sensors, e.g., micro-switches or optical sensors that are arranged along the shift gate 50. The sensors can be analog or digital sensors, whose signals are transmitted to an electronic control device 36. An output signal of the control device 36 directs the shift-actuating mechanism 25 to perform the gear shifts in the transmission as called for by the driver by way of the lever 24. The gear-shifting mechanism 25 may include, e.g., hydraulic cylinders and electromagnetically actuated control valves to move actuating members for shifting into and out of the different gears as disclosed, e.g., in the earlier patent application WO 97/05410. Actuating members driven by electric motors may also be used to operate the transmission. The shifting of gears can be controlled by characteristic curves or programs, or manually by means of a shifter mechanism such as a selector lever and/or a switch arranged on the steering wheel or similar means.

In addition to the signals related to the shift lever 24, the control device 36 receives signals from:

sensor 19a, indicating the degree of depression of the accelerator pedal 19;

sensor 30, indicating the degree of aperture of the throttle valve 18;

sensor 26, indicating the rpm rate of the engine;

sensor 42, indicating the rpm rate of the clutch disc;

sensor 34, indicating the position of the slave cylinder of the clutch actuator; and sensor 32, indicating which of the gears is engaged.

The control device 36 evaluates the sensor signals as a basis for actuating the clutch 14 when taking off from a stand-still condition or when shifting gears, as described, e.g., in the earlier patents or patent applications EP 00 38113, EP 00 43660, EP 01 01220, and WO 92/13208.

Beyond the sensors listed above, the control device 36 also receives signals from a door contact switch 52, an ignition switch 54, and from the brake switch 56 that belongs to the main brake system and may be arranged, e.g., at the brake pedal 58.

A warning buzzer 50 is connected to the control device 36, to alert or warn the driver when certain operating conditions occur. In addition to or instead of the warning buzzer 50, a blinking light or other warning/indicating means may be used. In addition, the transmission system includes a gear indicator 60 that indicates which gear is engaged in the transmission.

The system of the foregoing description is switched on when a signal is received from the door contact switch 52 that the door is being opened. The system stays on for a certain time interval to allow the driver to enter the vehicle and to activate the ignition switch 54 with the ignition key. If the ignition is not turned on within the fixed time interval after opening the driver door, the system is switched off.

If the time interval has expired, the system can be reactivated by inserting or turning the ignition key in the ignition switch 54 or by a further signal from the door contact switch 52 indicating that the driver door has been opened again.

After the ignition has been switched off with the key, the system may stay on for a predetermined waiting interval before shutting down, because otherwise the system would be restarted when the door is opened.

Figure 2A:
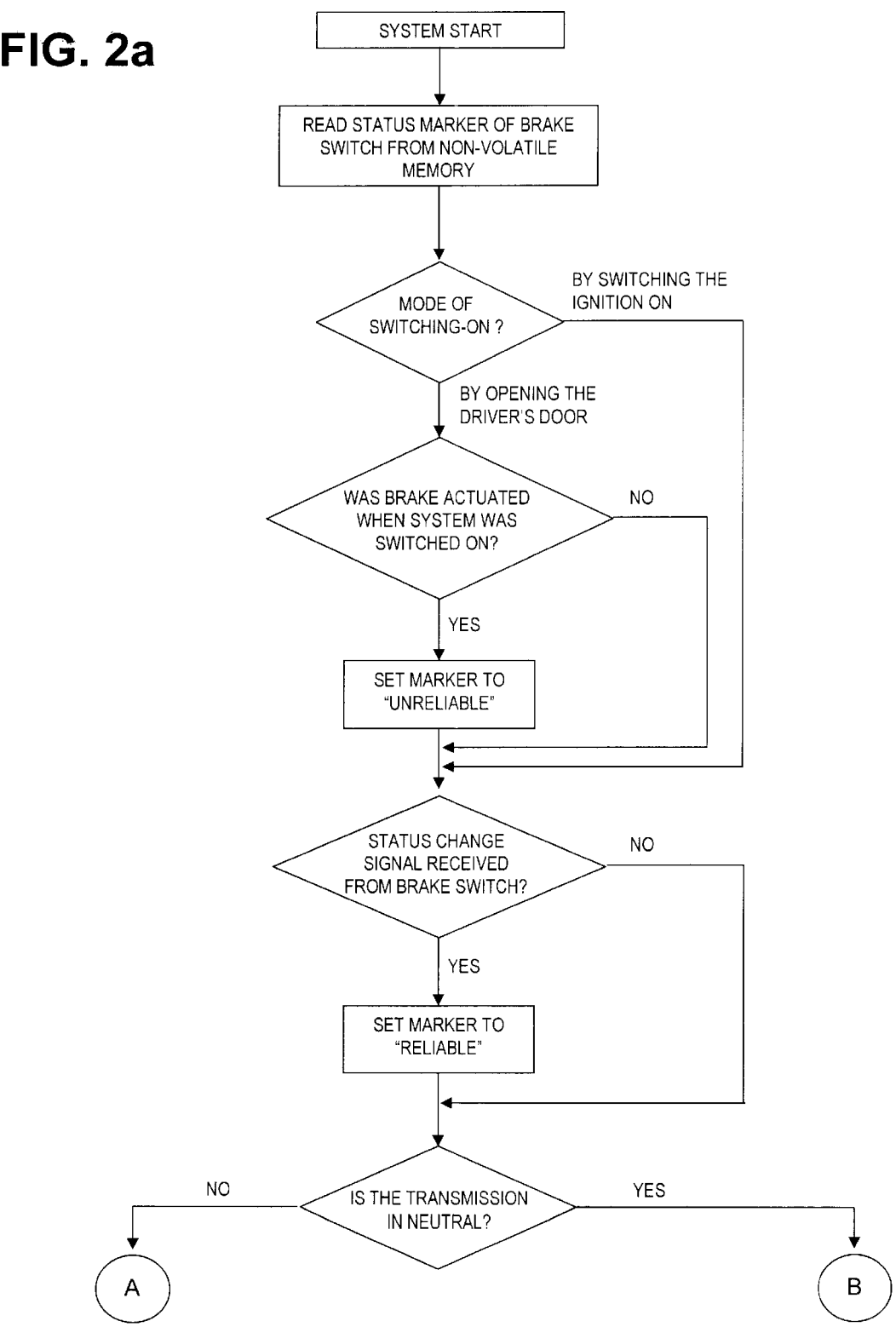
FIGS. 2a and 2b represent a flowchart of the steps of the control process of the transmission system according to the present invention.
Figure 2B:
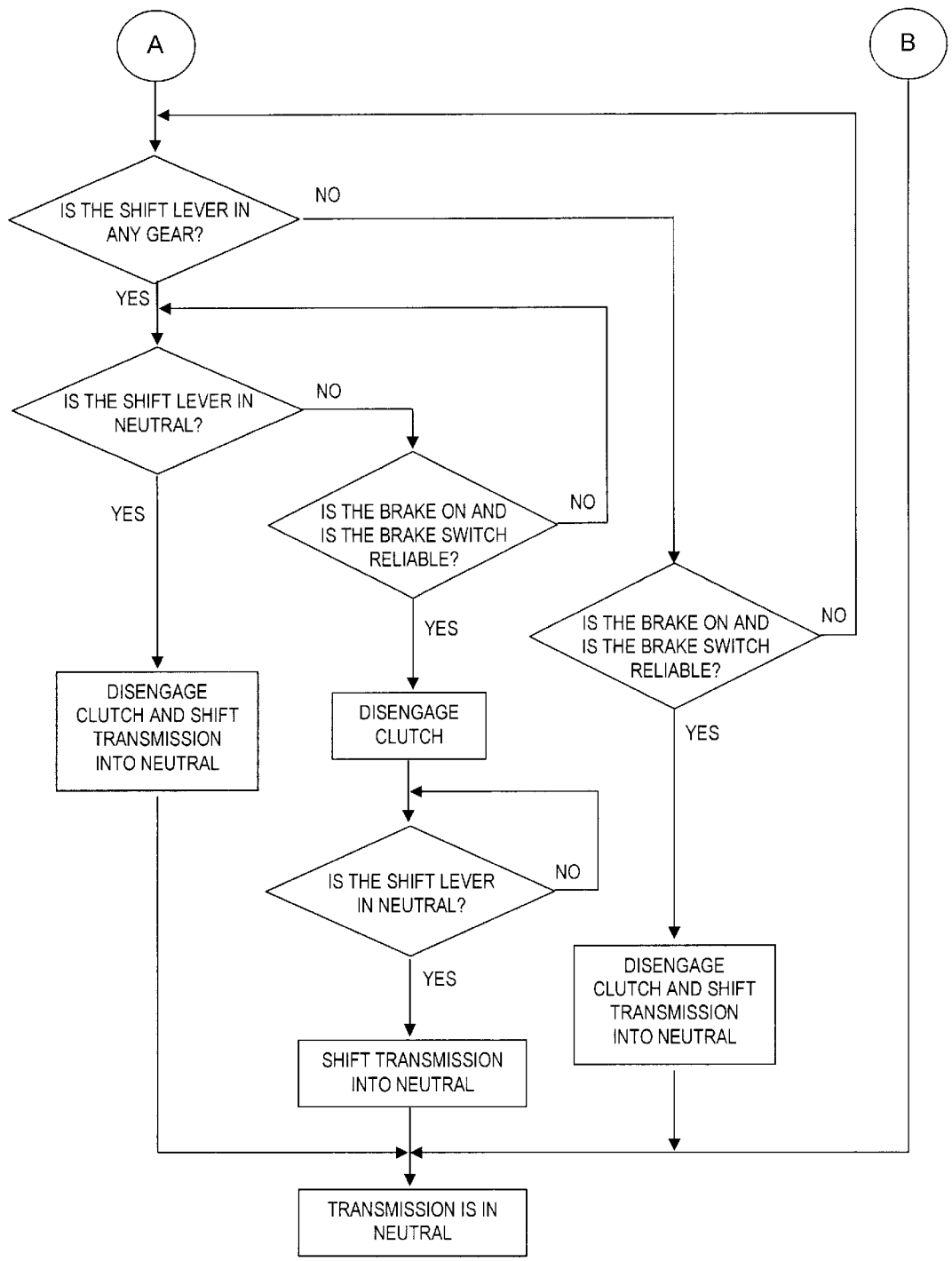

If upon activation of the system, the sensor 32 indicates that the transmission 12 is in the neutral position, switching the ignition on will cause the clutch 14 to disengage, and a further turning of the ignition key in the ignition switch 54 will cause the engine 10 to be started (see FIG. 2b).

If on the other hand, sensor 32 indicates upon activation of the system that a gear is engaged, the control device 36 will block the disengagement of the clutch when the ignition is turned on and it will also block the transmission 12 from shifting out of the engaged gear. With a gear engaged in the transmission 12, the engine 10 cannot turn over, so that the engine is blocked from being started.

The blocking of the clutch disengagement upon activating the ignition can be canceled by stepping on the brake pedal 58. If upon activation of the system, sensor 32 indicates that a gear is engaged, applying the main brake will allow the clutch 14 to disengage when the ignition is switched on. The shift lever 24 can be moved to the neutral position to shift out of the engaged gear, and the engine 10 can be started by turning the key farther in the ignition switch 54.

If the shift lever 24 is in one of the positions S or R, moving the lever 24 to N will cause the clutch to be disengaged and the transmission 12 to be shifted into the neutral position regardless of the state of actuation of the main brake.

With a shift lever 24 working in the manner described above, it is possible to move the lever 24 after the system has been turned off, so that the position of the lever 24 no longer corresponds to the actually engaged gear which is indicated by the sensor 32. Thus, the vehicle can for example be parked with a gear engaged, while the shift lever may have been moved to the neutral position (N) after switching the system off. When the system is subsequently switched on again, the automatic disengagement of the clutch and shifting out of gear to achieve conformance with the lever position is blocked. The gear indicator 60 blinks to inform the driver of the disagreement between the shift lever position and the actually engaged gear. After the system has been activated, applying the foot brake 58 will cause the clutch to be disengaged and the transmission to be shifted to neutral, so that the engine 10 can be started by turning the ignition key.

The brake switch 56 produces a signal when the foot brake 58 is applied. If the brake switch 56 is not working properly, the functioning of the latter is monitored as shown in FIG. 2a.

If the system is switched on by opening the driver-side door of the vehicle and the brake switch 56 indicates at the same time that the foot brake 58 is being applied (although it is physically impossible for the driver to have his foot on the brake) a flag marker for the brake switch is set to indicate a non-reliable condition.

If the brake switch 56 shows a change from a non-applied to an applied condition of the foot brake subsequent to switching the system on, the flag marker for the brake switch is set to correspond to a reliable condition, and the change from a non-applied to an applied state of the foot brake is accepted as an indication that the foot brake 58 has been applied.

After the engine 10 has been started and the vehicle has been set in motion, the reliability of the brake switch 56 is checked when certain operating conditions are present, e.g.:

1. If the vehicle accelerates to a speed of more than 50 km/h and then decelerates to a speed of less than 5 km/h on three different occasions without an indication from the brake switch 56 that the brake was applied, this is interpreted as an indication of a failure of the brake switch 56, where the latter permanently indicates a released condition of the foot brake. Consequently, an error code is registered in the error-code memory file.
2. While the brake switch 56 is in the position indicating that the foot brake is applied, the minimum speed level attained by the vehicle is registered. If the vehicle accelerates to and remains at a speed that is more than 30 km/h above the minimum speed and the brake switch does not indicate a release of the foot brake, this is interpreted as an indication of a failure of the brake switch 56, where the latter permanently indicates an applied condition of the foot brake. Consequently, an error code is registered in the error-code memory file.
3. An entry in the error code memory is canceled if the brake switch 56 correctly indicates a change between an applied and released state of the brake ten times in a row after the error code has been entered into the memory.

If an error code concerning the brake switch is present in the error code file at the time the system is shut down, an error flag for the brake switch is set to indicate an unreliable condition and stored in a non-volatile memory. In analogous manner, if no error code concerning the brake switch is present when the system is shut down, the flag is set to indicate a reliable state of the switch and stored in the non-volatile memory.

If the brake switch 56 indicates already at the activation of the system that the brake 58 is being used, and if there is no indication by the switch of a change from a released to an applied condition of the brake pedal, the signal announcing that the brakes are in use is ignored. The disengagement of the clutch 14 is blocked, unless the flag marker for the brake switch that was stored at the last previous shutdown of the system indicates a reliable condition. If the marker indicates a non-reliable state, the release of the clutch remains blocked.

In situations where the clutch release is blocked and the transmission cannot be shifted out of the engaged gear because the flag marker for the brake switch indicates a non-reliable condition, the blocking of the clutch and transmission with the shift lever in the neutral position can be canceled, if the driver moves the shift lever 24 into one of the positions S or R and back into the neutral position N. This will cause the clutch 14 to disengage, and the transmission will shift into neutral in response to the movement of the shift lever 24. The clutch 14 will remain in the disengaged condition until the current operating phase is superseded by subsequent events. The reason for allowing the clutch to disengage, even if the brake pedal is not depressed and the vehicle could therefore roll away, is that by moving the shift lever into a shift position and back into neutral, the driver can be assumed to be aware of the situation and take appropriate measures.

The concept outlined above can be modified in a number of ways without deviating from the invention. Although in the foregoing description, the clutch 14 and the transmission 12 are operated by hydraulic actuating members 22, 25, it is also conceivable to use, e.g., pneumatic or electrical actuating means, including electric motors.

While the embodiment of the foregoing description is a semi-automatic transmission, the invention would be equally appropriate for a fully automatic transmission of a kind where the car can be parked with the transmission in gear by turning the system off while the selector lever is in the drive position.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A transmission system for a motor vehicle equipped with an engine, a transmission with a plurality of gear ratios, a clutch, and a main brake; said transmission system comprising a control device, clutch-actuator means to engage and disengage the clutch, transmission-actuator means to move the transmission into and out of the different gear ratios, a shifter element movable into a plurality of shifter positions, gear-monitoring means to detect if the transmission is in gear, and means for blocking disengagement of the clutch and movement of the transmission into a neutral position for the purpose of starting the engine if upon activating the transmission system, the gear-monitoring means indicate that the transmission is in gear; wherein the transmission system has means to allow disengagement of the clutch if one of the two conditions a) and b) is present, where:

a) is a condition where the main brake is applied when activating the transmission system and where said application is positively confirmed;
   b) is a condition where the shifter element is in a non-neutral shifter position corresponding to one of said gear ratios and is moved to a neutral shifter position subsequent to activating the transmission system.

2. The transmission system of claim 1, wherein if the gear-monitoring means on activation of the transmission system finds that the transmission is in gear and if the shifter element is in one of said non-neutral shifter positions, moving said shifter element into the neutral shifter position will cause the control device to direct the clutch-actuator means to disengage the clutch and will further direct the transmission-actuator means to move the transmission into the neutral position.

3. The transmission system of claim 1, wherein if the gear-monitoring means on activation of the transmission system finds that the transmission is in gear and if the shifter element is in one of said non-neutral shifter positions, applying the main brake will cause the control device to direct the clutch-actuator means to disengage the clutch, and subsequently moving said shifter element into the neutral shifter position will cause the control device to direct the transmission-actuator means to move the transmission into the neutral position.

4. The transmission system of claim 1, wherein if the gear-monitoring means on activation of the transmission system finds that the transmission is in gear, and if the shifter element is in the neutral shifter position, the control device blocks disengagement of the clutch and blocks moving the transmission into the neutral position.

5. The transmission system of claim 4, wherein the control device cancels the blocking of the clutch disengagement and the movement of the transmission into the neutral position, after the main brake has been applied.

6. The transmission system of claim 1, wherein the application of the main brake is detected by a main-brake sensor.

7. The transmission system of claim 6, further comprising a means for monitoring the reliability of the main-brake sensor.

8. The transmission system of claim 7, wherein the monitoring means comprises setting a marker flag in a program of the control device, said marker flag being switchable between a first status indicating that the main-brake sensor is working correctly and a second status indicating a failure of the main-brake sensor.

9. The transmission system of claim 8, further comprising a door contact switch indicating when a driver-side door of the vehicle is being opened and thereby activating the transmission system, wherein the marker flag is set to the second status if the main-brake sensor indicates that the main brake is already applied as the vehicle door is being opened.

10. The transmission system of claim 9, wherein the marker flag is set to the first status if the main-brake sensor indicates a change from a non-applied condition to an applied condition of the main brake after the vehicle door has been opened.

11. The transmission system of claim 9, wherein the vehicle further comprises an ignition switch and wherein the transmission system is deactivated if the ignition switch is not turned on within a predetermined time interval after opening the driver-side door.

12. The transmission system of claim 11, wherein after said predetermined time interval has expired, the system is reactivated under at least one of the conditions that the ignition switch is turned on and that the driver-side door is opened again.

13. The transmission system of claim 8, wherein said monitoring takes place while the vehicle is in motion.

14. The transmission system of claim 13, wherein a detected malfunction of the main-brake sensor causes a brake-sensor failure code to be entered into a failure code file.

15. The transmission system of claim 14, wherein the brake-sensor failure code is entered after three instances where the vehicle was accelerated to a speed above a high threshold value and subsequently decelerated to a speed below a low threshold value without a signal from the main-brake sensor indicating an application of the main brake.

16. The transmission system of claim 14, wherein the control device keeps track of the lowest speed attained during a phase when the main-brake sensor indicates that the main brake is being applied, and wherein the brake-sensor failure code is entered if the vehicle is subsequently accelerated to and remains at a speed that is higher than said lowest speed by a predetermined differential amount during a predetermined time interval without a signal from the main brake sensor that the main brake was released.

17. The transmission system of claim 14, wherein the brake-sensor failure code is canceled in the failure code file after the main-brake sensor has signaled a predetermined number of status changes between an applied state and a non-applied state of the main brake.

18. The transmission system of claim 14, wherein at the time the transmission system is turned off, the status of the marker flag is stored in a non-volatile memory.

19. The transmission of claim 8, wherein the disengagement of the clutch after application of the main brake is blocked and the transmission is blocked from moving into the neutral position, if the shifter element is already in the neutral shifter position and the marker flag indicates the second status.

20. The transmission system of claim 19 wherein, if the shifter element is in the neutral shifter position and the marker flag indicates the second status, the clutch is disengaged and the transmission is moved to the neutral position after the shifter element has been moved to one of the non-neutral positions and back to the neutral position.

\* \* \* \* \*